United States Patent
Sugiyama

[11] Patent Number: 6,075,521
[45] Date of Patent: Jun. 13, 2000

[54] COORDINATE INPUT DEVICE

[75] Inventor: Keiichi Sugiyama, Kazo, Japan

[73] Assignee: Wacom Co., Ltd., Saitama-ken, Japan

[21] Appl. No.: 09/082,380

[22] Filed: May 21, 1998

[30] Foreign Application Priority Data

May 23, 1997 [JP] Japan ..................... 9-150207

[51] Int. Cl.⁷ ..................... G09G 5/00
[52] U.S. Cl. ............ 345/179; 345/157; 345/163; 345/173; 178/18.01; 178/18.03; 178/18.05; 178/18.06; 178/18.07
[58] Field of Search ............ 178/18.01, 18.03, 178/18.05, 18.06, 18.07; 345/179, 157, 163, 173

[56] References Cited

U.S. PATENT DOCUMENTS

| | | | |
|---|---|---|---|
| 4,878,553 | 11/1989 | Yamanami et al. | 178/18 |
| 5,025,410 | 6/1991 | Morita | 364/900 |
| 5,028,745 | 7/1991 | Yamanami et al. | 178/19 |
| 5,466,896 | 11/1995 | Murakami et al. | 178/19 |
| 5,691,747 | 11/1997 | Amano | 345/167 |
| 5,751,229 | 5/1998 | Funahashi | 341/5 |
| 5,850,477 | 12/1998 | Takada | 382/186 |
| 5,933,550 | 8/1999 | Fujieda et al. | 382/314 |
| 6,029,214 | 2/2000 | Dorfman et al. | 710/73 |

FOREIGN PATENT DOCUMENTS

| | | |
|---|---|---|
| 3-44726 | 2/1991 | Japan . |
| 4-238522 | 8/1992 | Japan . |

*Primary Examiner*—William A. Cuchlinski, Jr.
*Assistant Examiner*—Marthe Y. Marc-Coleman
*Attorney, Agent, or Firm*—Finnegan, Henderson, Farabow, Garrett & Dunner, L.L.P.

[57] ABSTRACT

A coordinate input device includes a casing having an upper surface and a lower surface which are not parallel to each other. A columnar position designating member is disposed within the casing. The angle of the position designating member as viewed from the upper surface is different from that as viewed from the lower surface. One of the upper surface and the lower surface is placed on a tablet. The coordinate input device thus designates and inputs coordinates while determining which surface of the casing is placed on the tablet. At least one of the designating positions of the position designating member is located in the vicinity of an edge of one of the upper surface and the lower surface, and an indicator is provided at a portion corresponding to the designating position. Thus, information on the tablet designated by the position designating member can be input regardless of which surface of the casing is placed on the tablet, thereby enhancing ease of operation of the coordinate input device.

12 Claims, 2 Drawing Sheets

COORDINATE INPUT DEVICE

BACKGROUND OF THE INVENTION

1. Field of the Invention

The present invention relates to a coordinate input device for use with a coordinate input apparatus, such as a tablet.

2. Description of the Related Art

Coordinate input devices designate particular position coordinates on a graphics tablet.

One coordinate input device includes a casing, the upper surface and the lower surface of which are not parallel to each other. A columnar position-designating member is provided within the casing in such a manner that the angle of the member as viewed from the upper surface is different from the angle of the member as viewed from the lower surface. The coordinate input device is able to input coordinates regardless of which surface is located on a tablet. In this device, the angle of the position designating member relative to the tablet varies according to which surface is placed on the tablet. Thus, the tablet calculates not only the designated position, but also the angle of the position designating member, and determines which surface, i.e., the upper surface or the lower surface, is being used to input coordinates.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

Accordingly, it is an object of the present invention to provide an improved coordinate input device.

A coordinate input device for use with a tablet according to this invention comprises a casing having a first surface and an opposing second surface, the first and second surfaces being nonparallel and a position-designating member in the casing, the position-designating member and the first surface defining an angle different from an angle defined by the position designating member and the second surface.

According to one aspect of the present invention, there is provided a coordinate input device including a casing having an upper surface and a lower surface which are not parallel to each other. A columnar position-designating member is disposed within the casing in such a manner that the angle of the columnar position-designating member as viewed from the upper surface is different from the angle of the columnar position-designating member as viewed from the lower surface. The coordinate input device then designates and inputs coordinates so that it is possible to determine which surface of the casing is placed on a tablet. Absolute coordinate input is performed when one of the upper surface and the lower surface of the casing is placed on the tablet, while relative coordinate input is performed when the other surface is placed on the tablet.

With this arrangement, absolute coordinates are input using either the upper surface or the lower surface of the casing, while relative coordinates are input using the other surface. This enables the operator to easily select absolute coordinates or relative coordinates depending on which surface is placed on a tablet.

According to another aspect of the present invention, there is provided a coordinate input device including a casing having an upper surface and a lower surface which are not parallel to each other. A columnar position-designating member is disposed within the casing in such a manner that the angle of the columnar position-designating member as viewed from the upper surface is different from the angle of the columnar position-designating member as viewed from the lower surface. The coordinate input device then designates and inputs coordinates so that it is possible to determine which surface of the casing is placed on a tablet. At least one designating position of the columnar position-designating member is located in the vicinity of an edge of one of the upper surface and the lower surface, and an indicator is provided at a portion corresponding to the designating position. Absolute coordinate input is performed using the surface on which the indicator is provided. In this case, relative coordinate input may be performed using the surface opposite to the surface on which the indicator is provided.

According to a further aspect of the present invention, there is provided a coordinate input device including a casing having an upper surface and a lower surface which are not parallel to each other. A columnar position-designating member is disposed within the casing in such a manner that the angle of the columnar position-designating member as viewed from the upper surface is different from the angle of the columnar position-designating member as viewed from the lower surface. The coordinate input device then designates and inputs coordinates so that it is possible to determine which surface of the casing is placed on a tablet. At least one designating position of the columnar position-designating member is located at an edge of any one of the upper surface and the lower surface. The edge is projected to form an indicator, whereby absolute coordinate input is performed using the surface on which the indicator is provided. In this case, relative coordinate input may be performed using the surface opposite to the surface on which the indicator is provided.

With this arrangement, since absolute coordinates are input from a portion at which the indicator is provided, it is possible to input coordinates using the indicator as a mark through a menu sheet placed on the tablet or to trace a design of a drawing placed on the tablet. Further, on the surface which is not provided with the indicator, coordinates can be input through a menu or an icon displayed on the screen using relative coordinate input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENT

The present invention is embodied in a position pointing or coordinate input device used with an associated graphics tablet. The coordinate input device inputs information such as graphics or a drawing by tracing on the graphics tablet. Examples of coordinate input devices and graphics tablets are disclosed in U.S. Pat. Nos. 4,878,553 and 5,466,896, the disclosures of which are hereby incorporated by reference.

A coordinate input device according to an embodiment of the present invention is described below with reference to the drawings.

Figure 1:
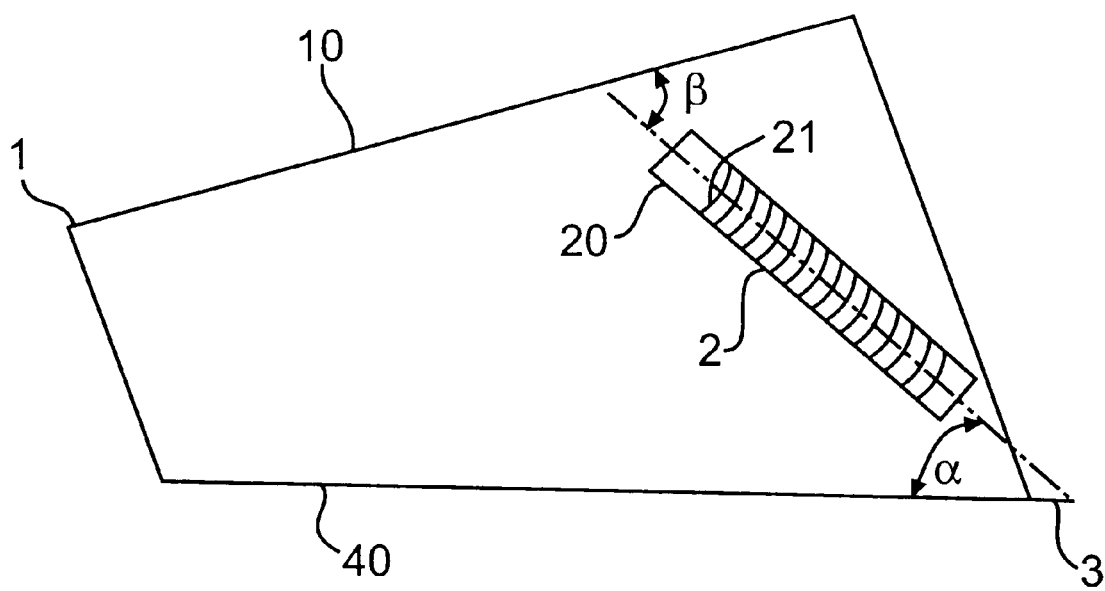
FIG. 1 is a side perspective view illustrating a coordinate input device according to an embodiment of the present invention.

FIG. 1 is a sectional view illustrating a coordinate input device according to an embodiment of the present invention. FIG. 1 shows a box-like casing 1, the upper surface 10 and the lower surface 40 of which face each other and are not parallel to each other. Both the upper surface 10 and the lower surface 40 are flat and are thus able to smoothly move on the input plate of a tablet.

Provided within the casing 1 is a columnar position-designating member 2. The position designating member 2 designates a position on the tablet to be input into a computer. The position designating member 2 forms a predetermined angle $\alpha$ in relation to the bottom surface 40 and forms a predetermined angle $\beta$ ($\beta$ is not equal to $\alpha$) in relation to the upper surface 10.

The position designating member 2 may comprise a tuning circuit of a tuning frequency f formed by connecting a capacitor to a columnar ferrite core 20 around which a coil 21 is wound. The capacitor is not shown in FIG. 1. As noted above, the position designating member 2 is provided within the casing 1 in such a manner that the angle of the member 2 as viewed from the upper surface 10 differs from the angle of the member 2 as viewed from the lower surface 40.

An angle detection means in the tablet determines which surface of the position designating member 2 is placed on the input plate of the tablet. Normally, a tablet, which serves as a coordinate input apparatus, is not provided with such angle detection means. However, the coordinate input device of the present invention is conditionally used with a tablet provided with such angle detection means. U.S. Pat. No. 5,751,229, the disclosure of which is hereby incorporated by reference, discloses a tablet provided with such means, and an explanation thereof is thus omitted in this specification.

Figure 2:
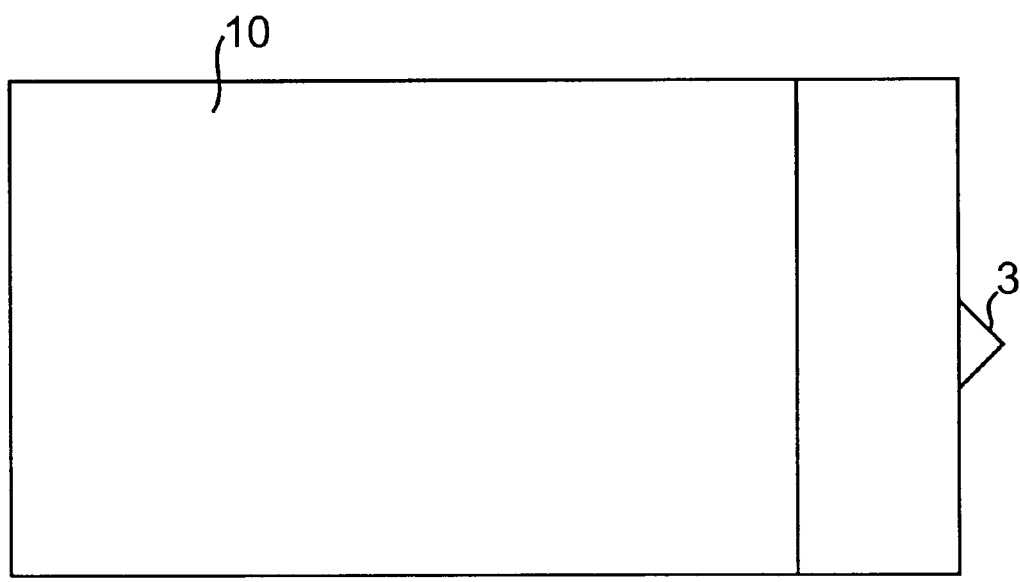
FIG. 2 is a plan view illustrating a coordinate input device according to an embodiment of the present invention.

The position designating member 2 designates coordinates on a tablet at position indicator 3. The position designating member 2 is thus disposed, as shown in FIG. 1, so that the forward end of the indicator 3 is placed near the edge of the lower surface 40 of the member 2. Referring to a plan view of the coordinate input device shown in FIG. 2, the position (XY coordinates) of the forward end of the indicator 3 is input into a computer. The indicator 3 may be formed of a member different from the bottom surface 40 or may be integrally made of the same material as the bottom surface 40.

The indicator 3 is very convenient for inputting coordinates of a menu-sheet placed on a tablet or for tracing a predetermined design placed on a tablet. Generally, a cursor device is provided with cross hairs, which are made of narrow lines within a transparent member, and the cursor device inputs coordinates based on the position of the cross hairs. A coil and a magnet for designating coordinates are further disposed around the cross hairs. This arrangement makes it difficult to recognize input items of a menu-sheet placed on the tablet, thereby causing erroneous inputs. According to the coordinate input device of the present embodiment, however, only the indicator 3 projects from the edge of the casing 1. This design allows easy and correct inputting of positions (coordinates) when using a menu-sheet or when tracing a design on a tablet.

Figure 3:
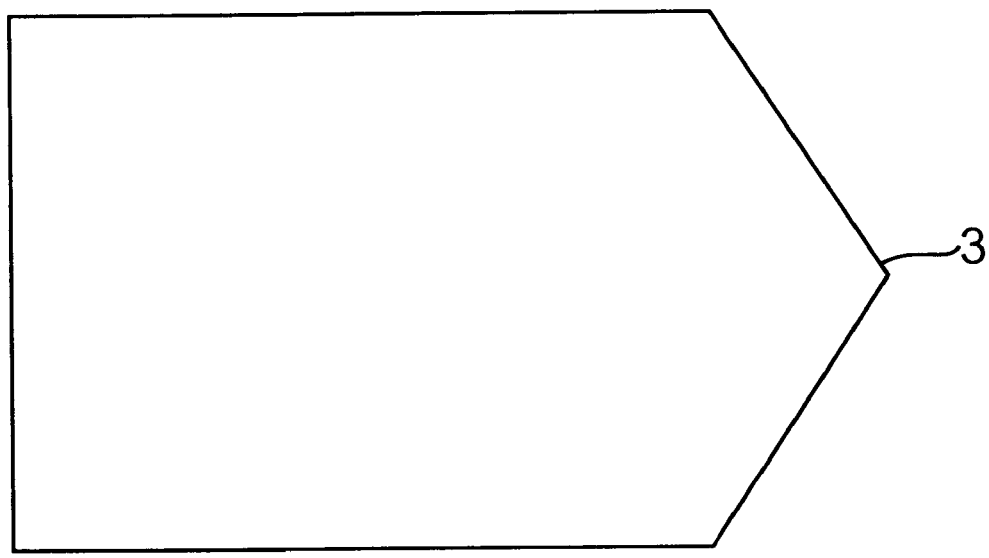
FIG. 3 is a bottom view illustrating an example of modifications made to a coordinate input device according to an embodiment of the present invention.

Alternatively, a projection may be formed, as illustrated in FIG. 3, on the lower surface 40 of the casing 1 and used as the indicator 3. In this case, position designating means may be disposed within the casing 1 so that the forward end of the projection may be positioned on coordinates to be input.

In the coordinate input device of the present embodiment, the upper surface 10 of the casing 1 may be placed on a tablet, i.e., the device may be turned upside down to input positions. In the present embodiment, the input mode used in which the device is turned upside down is referred to as "displacement/displacement direction input" or "relative coordinate input".

Absolute and relative coordinates are input via a predetermined interface into tablet driver software installed in a computer. The computer calculates relative coordinates as a displacement($\Delta X$, $\Delta Y$) of the device per unit time and inputs the coordinates into application software. For example, the absolute coordinates designated by the device at a certain time are indicated by ($X_1$, $Y_1$), and the absolute coordinates designated by the device after a lapse of 50 m seconds are represented by ($X_2$, $Y_2$). The displacement and displacement direction of the device during the above time interval is $X_2-X_1$ in the X direction and $Y_2-Y_1$ in the Y direction. Accordingly, $X_2-X_1=\Delta X$ and $Y_2-Y_1=\Delta Y$ are sent to the application software as relative coordinates.

Figure 4:
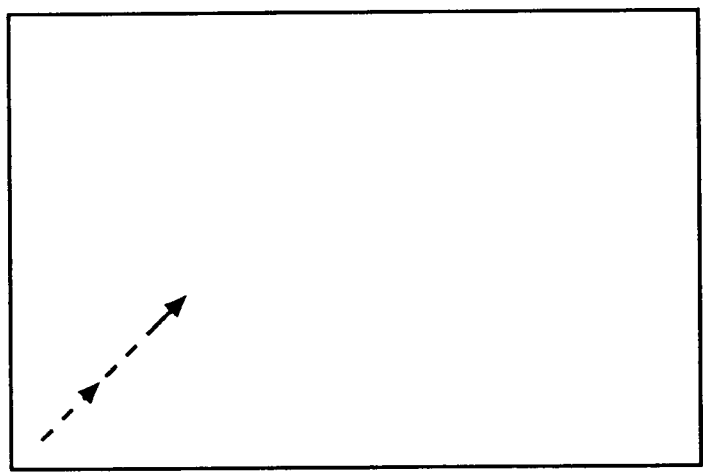
FIG. 4 illustrates the movement of a cursor on a display screen.

The computer in which the application software is installed moves a cursor (for example, an arrow) indicated on the display screen, as shown in FIG. 4. In this embodiment, the input area of the tablet does not correspond to the display area in a one-to-one relationship. Instead, the tablet driver is programmed in such a manner that the cursor moves within only a part (for example, one half) of the display screen even if the coordinate input device is shifted from one end to the other end of the input area of the tablet in each of the X and Y directions. If the cursor must be moved further than the input area of the tablet, the device must be returned to the original position on the tablet, and the operation similar to the foregoing operation repeated. In this case, the cursor is returned not by dragging it on the tablet, but by floating it with a slight gap over the surface of the tablet. The application software executes processing corresponding to an instruction concerning the contents of a menu or an icon displayed on the screen where the cursor is positioned. The instruction is given by means of a switch provided for the device.

Coordinates are input as absolute coordinates when the lower surface 40 is placed on the tablet, while instructions are input as relative coordinates when the upper surface 10 is located on the tablet. Thus, the tablet may be used not only for inputting coordinates as absolute coordinates when a menu-sheet is placed on it, but also for inputting instructions by operating a menu or an icon displayed on the screen. In the latter case, the relative coordinates are preferably used. This is described more specifically below.

Software applications may designate windows for inputting instructions through menus or icons. Since many menus and icons are displayed on windows, the display unit is becoming larger with a higher resolution to enlarge the display area and to enhance the legibility of display characters. On the other hand, a tablet used as an input apparatus is becoming smaller because of limitations in the work space on desks. If the input area of a small tablet corresponds to a large display unit on a one-to-one basis, a slight movement of the cursor device on the tablet causes a large movement of the cursor on the display. Further, the number of menus and icons displayed on the windows is increasing requiring each menu and each icon to be very small. Accordingly, when instructions are input by means of such small menus and icons, the cursor device on the tablet is required to move precisely and subtly, which movement matches the sizes of the menus and icons. Such a movement is suitably performed using relative coordinate input.

Various methods may be used for inputting coordinate data detected by a tablet to application software. Two example methods are as follows.

(1) Via a Serial Interface

Normally, a serial interface in compliance with RS-232C is built into a personal computer. For transmitting coordinate data detected by a tablet via a serial interface to a computer, an analog signal detected by a flat sensor is first converted into a parallel digital coordinate signal within the tablet and is further converted into serial data. The serial data is then transmitted to a tablet driver (software) installed in the computer. The tablet driver then calculates the angle of the position designating member according to the absolute coordinate data. If the calculated angle is a shown in FIG. 1, the absolute coordinates are directly sent to the application software. In contrast, if the angle is β shown in FIG. 1, the absolute coordinates are first converted into relative coordinates with a predetermined time interval and then sent to the application software.

(2) Via a Mouse Interface

A serial interface usually transmits tablet coordinate data to a computer, because the serial interface is a standardized interface integrated into almost all computers. On the other hand, a mouse interface generally only transmits signals from a mouse. Since signals from a tablet are completely different from signals from a mouse in format and transmitting protocol, they cannot be directly sent to a computer through a bus mouse interface.

Although the mouse interface has the above disadvantage, the serial interface is often connected to a printer or a modem. Therefore, there is an increasing demand for the use of another type of interface to transmit tablet coordinate data. A tablet may be used in place of a mouse. Then, the mouse interface is unoccupied and may be used to transmit tablet coordinate data. In view of the above point, the present inventor has proposed a method for transmitting tablet coordinate data to a computer utilizing a bus mouse interface or a bi-directional parallel bus (which has been developed by transmitting signals from a mouse, hereinafter referred to as "BPB") used in a polling-type computer (Japanese Unexamined Patent Publication Nos. 3-44726 and 4-238522, the disclosures of which are hereby incorporated by reference).

If the bus mouse interface transmits coordinate data, absolute coordinates (XY coordinates) designated by the coordinate input device are converted into a signal having a number of pulse trains corresponding to the magnitude of the coordinates before transmission to a tablet driver. The tablet driver then reproduces the XY coordinates (absolute coordinates) designated by the device according to the number of pulse trains and calculates the angle of the position designating member from the reproduced coordinates. If the angle is α, the tablet driver directly sends the reproduced absolute coordinates to the application software. If the angle is β, the tablet driver converts the absolute coordinates into relative coordinates after a predetermined time interval and sends the relative coordinates to the application software.

If the BPB interface is employed, the angle of the position designating member is calculated from the absolute coordinate data sent to a host computer, and based on the calculated angle, absolute coordinates or relative coordinates are transmitted to the application software, as in the use of the bus mouse interface.

Regardless of which interface is used, a switch, provided on a tablet or position pointing device, may indicate absolute coordinates or relative coordinates. According to the present embodiment, absolute coordinates and relative coordinates can be switched merely by placing the coordinate input device upside down. This embodiment thus eliminates the need to provide for a switch for the tablet and enhances the simplicity of the tablet.

It should be noted that one or a plurality of operating switches similar to those provided for a cursor device or a mouse may be disposed on a lateral surface of the casing of the device so as to input the contents of any given menu or icon.

A coordinate input device according to this embodiment thus includes a casing having an upper surface and a lower surface which are not parallel to each other. A columnar position-designating member is disposed within the casing. The angle of the position designating member as viewed from the upper surface is different from that as viewed from the lower surface. One of the upper surface and the lower surface is placed on a tablet. The coordinate input device then designates and inputs coordinates so that it is possible to determine which surface of the casing is placed on the tablet. Absolute coordinate input is performed by using one surface of the casing, while relative coordinate input is performed by using the other surface of the casing. Accordingly, the absolute coordinates or the relative coordinates can be switched merely by selecting the surface to be placed on the tablet. Namely, it is only essential that the inclination of the position designating member is detected, and a known tablet which is not provided with a switch for changing the absolute coordinates and relative coordinates suffices, thereby enhancing the simplicity of the tablet.

Moreover, at least one of the designating positions of the position designating member is located in the vicinity of an edge of either the upper surface or the lower surface, and an indicator is provided at a portion corresponding to the designating position. Absolute coordinate input is performed by using the surface on which the indicator is provided. It is thus possible to efficiently input absolute coordinates from a menu sheet placed on a tablet based on an indicator that is free from a coil and a magnet, which are conventionally required around the indicator for inputting coordinates. Further, relative coordinates are input on the surface opposite to the surface on which the indicator is provided. Accordingly, absolute coordinates and relative coordinates can be switched by selecting the surface to be placed on a tablet. Namely, it is only essential that the inclination of the position designating member is detected, and a known tablet which is not provided with a switch for changing the absolute coordinates and relative coordinates suffices. Thus, the tablet can be simplified.

Alternatively, at least one of the designating positions of the position designating member is located at an edge of either the upper surface or the lower surface of the casing, and the edge is projected to form an indicator. The absolute coordinate input is then performed using the surface on which the indicator is provided. Absolute coordinates can thus be efficiently input from a menu sheet placed on a tablet based on an indicator that is free from a coil and a magnet, which are conventionally required around the indicator for inputting coordinates. Further, relative coordinate input is performed using the surface opposite to the surface on which the indicator is provided. Namely, it is only necessary that the inclination of the position designating member is detected, and a known tablet which is not provided with a switch for changing the absolute coordinates and relative coordinates suffices. This increases the simplicity of the tablet.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A coordinate input device for use with a tablet, comprising:
    a casing having a first surface and an opposing second surface, the first and second surfaces being nonparallel; and
    a position-designating member in the casing, the position-designating member and the first surface defining an angle different from an angle defined by the position designating member and the second surface;
    wherein absolute coordinate input is performed when the first surface is placed on a tablet and relative coordinate input is performed when the second surface is placed on a tablet, and wherein said device changes from performing absolute coordinate input to performing relative coordinate input as a result of the physical movement of the casing from having the first surface placed on the tablet to having the second surface placed on the tablet, and said device changes from performing relative coordinate input to performing absolute coordinate input as a result of the physical movement of the casing from having the second surface placed on the tablet to having the first surface placed on the tablet.

2. A coordinate input device according to claim 1, wherein the position-designating member has a columnar shape.

3. A coordinate input device according to claim 1, wherein the position-designating member comprises a tuning circuit formed by winding a coil around a ferrite core.

4. A coordinate input device according to claim 1, further comprising an operating switch.

5. A coordinate input device for use with a tablet, comprising:
    a casing having a first surface and an opposing second surface, the first and second surfaces being nonparallel;
    a position-designating member in the casing, the position-designating member and the first surface defining an angle different from an angle defined by the position designating member and the second surface; and
    a position indicator extending from the first surface, the position indicator being near a position designated by the position-designating member, wherein a tablet indicates absolute coordinates when the first surface is placed on a tablet, and wherein said tablet changes from indicating absolute coordinates to indicating relative coordinates as a result of the physical movement of the casing from having the first surface placed on the tablet to having the second surface placed on the tablet, and said tablet changes from indicating relative coordinates to indicating absolute coordinates as a result of the physical movement of the casing from having the second surface placed on the tablet to having the first surface placed on the tablet.

6. A coordinate input device according to claim 5, wherein the position-designating member has a columnar shape.

7. A coordinate input device according to claims 6, wherein relative coordinate input is performed when the second surface is placed on the tablet.

8. A coordinate input device according to claim 5, wherein the position indicator is integral with the first surface.

9. A coordinate input device according to claims 8, wherein relative coordinate input is performed when the second surface is placed on the tablet.

10. A coordinate input device according to claims 5, wherein relative coordinate input is performed when the second surface is placed on the tablet.

11. A coordinate input device according to claim 5, wherein the position-designating member comprises a tuning circuit formed by winding a coil around a ferrite core.

12. A coordinate input device according to claim 5, further comprising an operating switch.

* * * * *